United States Patent
Pawlowski

(10) Patent No.: US 7,511,220 B2
(45) Date of Patent: Mar. 31, 2009

(54) CABLE PROTECTION AND METHOD FOR MOUNTING A CABLE PROTECTION

(75) Inventor: Artur Pawlowski, Göteborg (SE)

(73) Assignee: Volvo Lastvagnar AB, Gothenburg (SE)

( * ) Notice: Subject to any disclaimer, the term of this patent is extended or adjusted under 35 U.S.C. 154(b) by 303 days.

(21) Appl. No.: 11/566,514

(22) Filed: Dec. 4, 2006

(65) Prior Publication Data

US 2007/0089892 A1    Apr. 26, 2007

Related U.S. Application Data

(63) Continuation of application No. PCT/SE2005/000856, filed on Jun. 3, 2005.

(30) Foreign Application Priority Data

Jun. 3, 2004    (SE)    ................................ 0401445

(51) Int. Cl.
   *H01R 4/00*    (2006.01)
(52) U.S. Cl. ................. 174/74 R; 174/77 R; 174/84 R; 174/88 R
(58) Field of Classification Search ............... 174/74 R, 174/77 R, 84 R, 88 R, 93, DIG. 8, 92
See application file for complete search history.

(56) References Cited

U.S. PATENT DOCUMENTS

| | | | | |
|---|---|---|---|---|
| 4,268,041 A | * | 5/1981 | Sovish et al. | ................. 277/314 |
| 4,421,945 A | * | 12/1983 | Moisson | ........................ 174/92 |
| 4,693,767 A | * | 9/1987 | Grzanna et al. | ................ 156/49 |
| 4,868,967 A | * | 9/1989 | Holt et al. | ........................ 29/450 |
| 6,107,574 A | * | 8/2000 | Chang et al. | ............... 174/77 R |
| 6,321,524 B1 | | 11/2001 | Bro | |
| 7,232,955 B1 | * | 6/2007 | Shadel et al. | .............. 174/74 R |

FOREIGN PATENT DOCUMENTS

| | | |
|---|---|---|
| EP | 0316911 A2 | 5/1989 |
| JP | 11325374 A | 2/2000 |
| WO | 2000-36614 A1 | 6/2000 |
| WO | 2004040348 A1 | 5/2004 |

* cited by examiner

Primary Examiner—William H Mayo, III
(74) Attorney, Agent, or Firm—Novak Druce & Quigg LLP

(57) ABSTRACT

Cable protection and a method for applying the protection. In a hoselike outer cover (3), there are support members (6) for holding in position a cable portion (2) extending axially in the outer cover with intermediate space relative to the inside wall (4) of the outer cover. A heat-shrinkable film (5) surrounds the cable portion (2) over the length of one of the support members (6) and is oriented for shrinking in the axial direction. The support members (6) are connected to the heat-shrinkable film and expand radially outwards towards the inside wall (4) of the protective cover in response to axial contraction of the heat-shrinkable film.

10 Claims, 3 Drawing Sheets

CABLE PROTECTION AND METHOD FOR MOUNTING A CABLE PROTECTION

CROSS-REFERENCE TO RELATED APPLICATIONS

The present application is a continuation patent application of International Application No. PCT/SE2005/000856 filed 03 Jun. 2005 which is published in English pursuant to Article 21(2) of the Patent Cooperation Treaty and which claims priority to Swedish Application No. 0401445-2 filed 03 Jun. 2004. Said applications are expressly incorporated herein by reference in their entirety.

FIELD

The present invention relates to an arrangement for providing cable protection and a method of fitting and utilizing such a cable protection. The cable protector includes a tubular or hose-like outer cover and a support means for holding in position a cable portion extending axially in the outer cover with intermediate space relative to an inside wall of the outer cover.

BACKGROUND

Cables, such as electric wires that are at risk of shaking and vibration and to being exposed to moisture and drenching with liquid, are usually laid in corrugated flexible protective tubing. A previously known practice in this respect is to provide some form of spacing means as protection against wear caused by rubbing between the cables and the inside wall of the tubing. An example is found in WO 2000-36614. The spacing means according to this publication takes the form of expansible foam material that is expanded to at least partly fill the space in the tubing. Foam material is mechanically sensitive and highly flexible in response to powerful stresses.

SUMMARY

A beneficial aspect of the present invention is to provide a cable protection arrangement as well as provide a method for fitting such a cable protection about a cable in a manner that ensures the cable will be held in a proper orientation with respect to the protector and that is easy to install and fit.

BRIEF DESCRIPTION OF THE DRAWINGS

The invention is exemplarily described below in more detail and with reference to the attached drawings in which.

DETAILED DESCRIPTION

Figure 1:
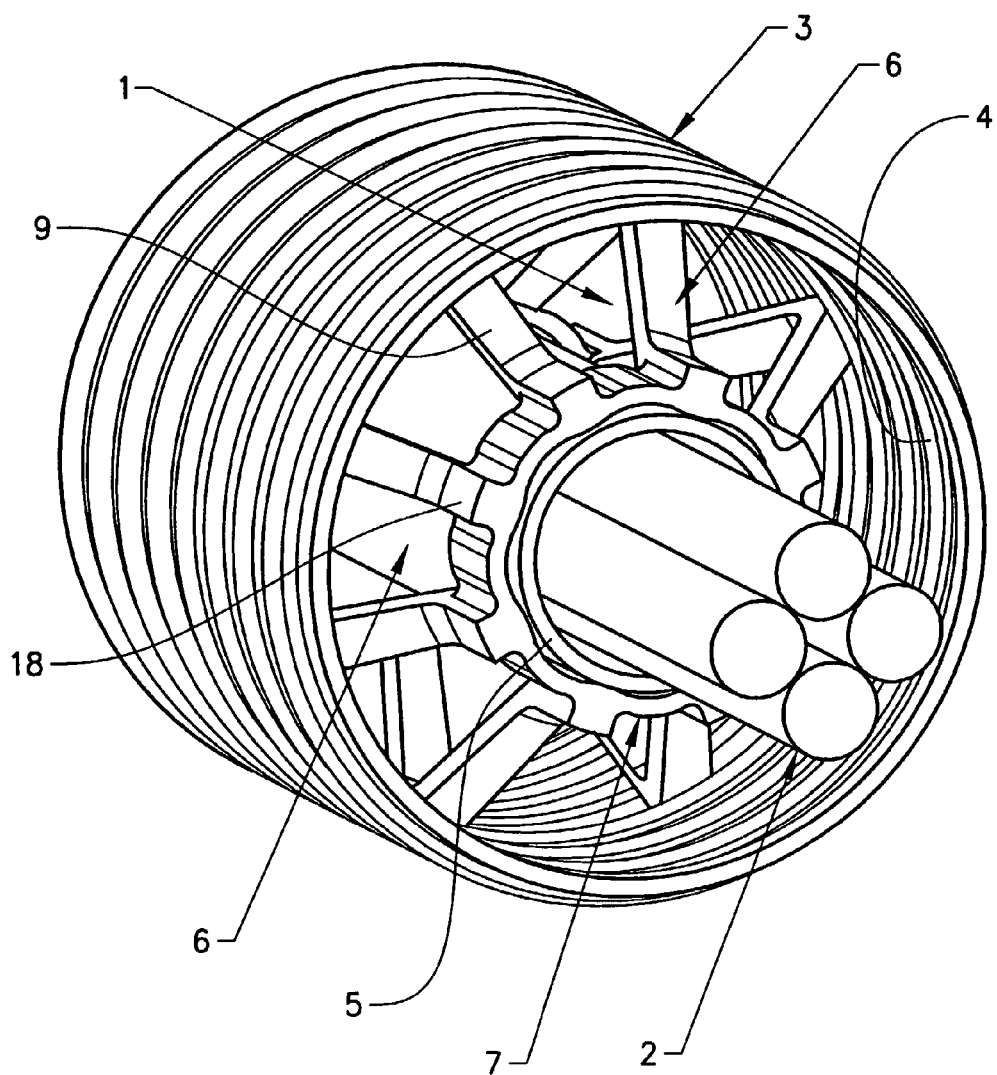
FIG. 1 is a perspective view of the cable protection arrangement configured according to the teachings of the present invention and which shows a flexible protective tube fitted about a cable portion.

The construction of the cable protection (also referred herein as cable protector and cable protection arrangement) is described herein below using like reference numerals for correlation to the three associated drawings. In one embodiment, the cable protection according to the invention takes the form of spacing means situated between a cable portion 2 and a protective cover 3 (which exemplarily takes the form of a flexible corrugated tube whose smallest inside diameter considerably exceeds the outside diameter of the cable portion) with the result that an intermediate space is formed between the exterior of the cable portion 2 and the inside wall 4 of the protective cover 3. The cable portion takes the form, in the example depicted, of an electric cabling comprising four wires, each surrounded by electrical isolation which needs protection against wear and abrasion. The cabling may itself be provided with a surrounding electrically isolating and mechanically protective cover which needs protection against wear and abrasion against the inside wall 4 of the protective tube. The cable portion may be intended to convey something other than electric current and may take the form of optical fiber, but may also alternatively be a fluid line whose cover needs protection against wear.

Figure 2:
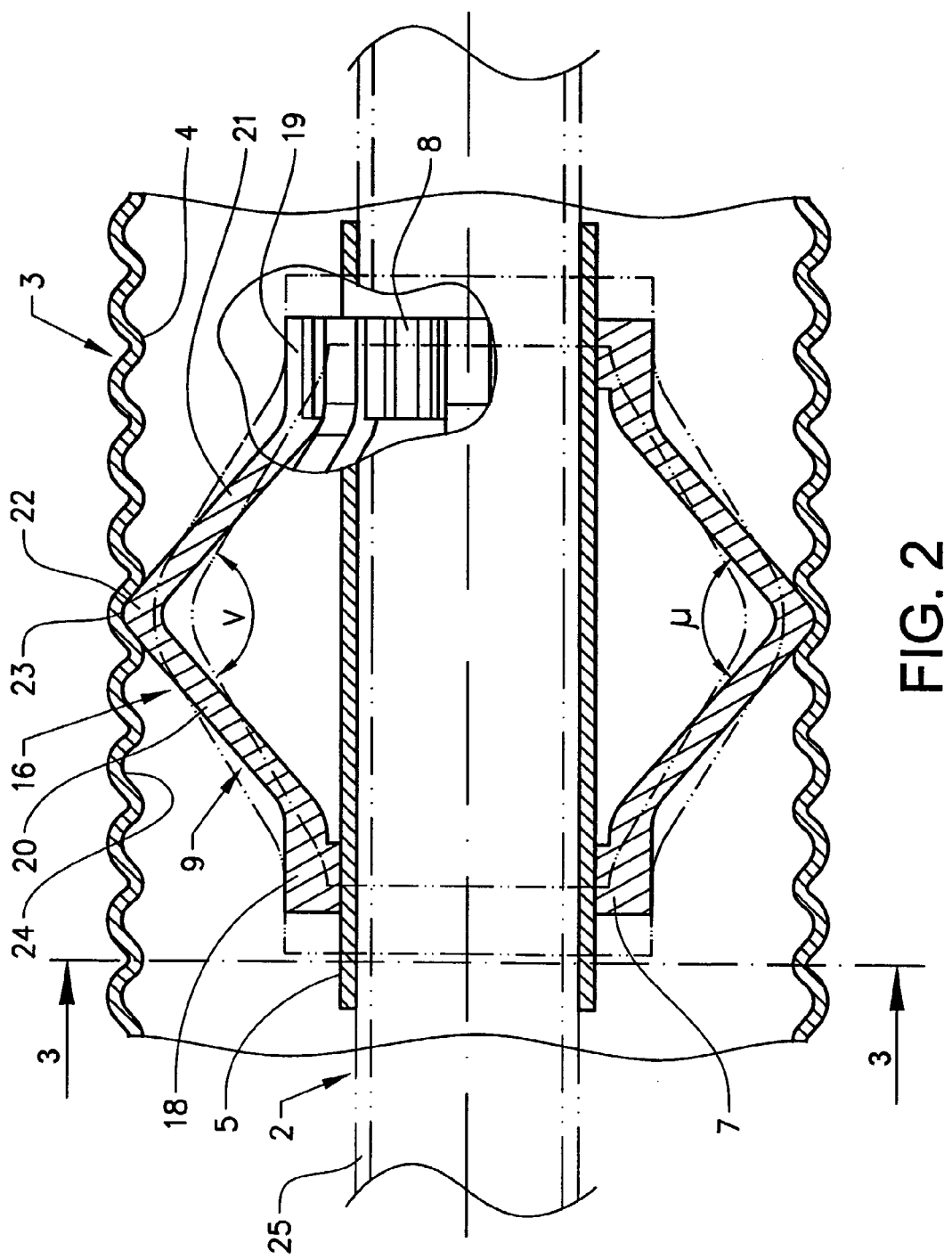
FIG. 2 is longitudinal section (with partial cut-away) through the cable protection arrangement including the cable portion and the protective tube taken along the line 2-2 in FIG. 3.
Figure 3:
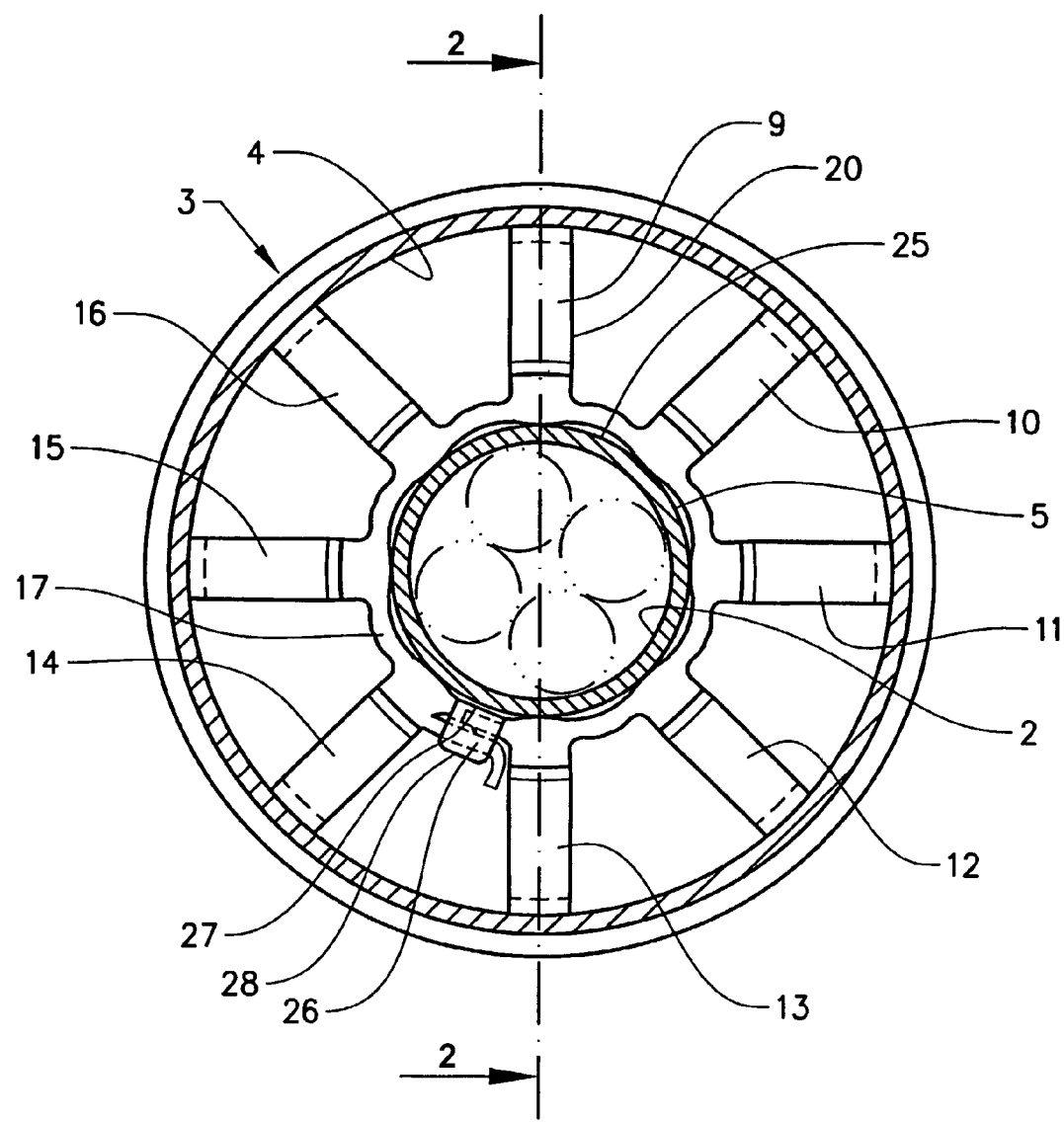
FIG. 3 is a cut-away section taken along the line 3-3 of FIG. 2 at a location that cuts through the cable portion and the protective tube but which is ahead of the support means that maintains distance between the cable and tube.

To this end, a heat-shrinkable tubing 5 which surrounds the cable portion 2 along at least parts of the latter's length forms part of the cable protection. In addition to the heat-shrinkable tubing, the cable protection also comprises support means 6 extending between the cable portion 2 and the inside wall 4 of the outer tube 3. The support means take the form of at least two annular portions or ring portions 7, 8, which surround the cable portion 2 peripherally round the outside of the heat-shrinkable tubing 5, and a plurality, at least two in number, of spacing means 9-16 which constitute bridging portions between, on the one hand, the two annular portions 7, 8 and, on the other hand, the inside wall 4 of the outer tube 3. The number of spacing means (members) may vary greatly; FIG. 1 depicts seven spacing means whereas FIGS. 2 and 3 depict eight spacing means. The number of spacing means and the width of each spacing means depends on the application concerned. In the case of two spacing means, relatively large segments of a circle need to be covered in order to provide sufficient support in all directions, but two spacing means may be sufficient in the case of small diameters, whereas three, four or five spacing means may be sufficient in many cases.

As may be seen in FIGS. 1 and 3, the annular portions 7, 8 in the example depicted are circular but exhibit small humps between the spacing means 9-16 thereby increasing the contact pressure and providing some resilience in the annular portions. At the same time, it is essential that the contact between the heat-shrinkable tubing 5 and the annular portion is firm, and it may be strengthened, for example, by some form of bonding means or protrusions that provide assured engagement with the heat-shrinkable tubing. The shape and consequent elasticity of the annular portions 7, 8 enable flexible adaptation to various diameters of cable. Still further, the heat-shrinkable tubing is elastic. The annular portions 7, 8 may in their simplest form be closed ring portions with suitably adapted diameter, but they may alternatively be broken and closable; i.e. lockable, at two meeting and possibly overlapping ends 26, 27 to form closed rings by means of a lock 28; e.g. of the cable tie type, so that the ring portions can be adapted to different diameters of the cable 2.

At each support means the two annular portions 7, 8 are situated at a suitably adapted axial distance from one another which is of at least the same order of magnitude as the outer diameter of the cable portion or preferably exceeds the same. The spacing means 9-16 each have two end portions 18, 19 firmly attached to, or fully integrated with each of the annular portions. The spacing means 9-16 also have two intermediate portions 20, 21 connected articulately to the respective end portion and extending to a common bending joint 22 adapted to bearing against the inside wall 4 of the outer tube 3. In the example depicted, the intermediate portions 20, 21 are relatively straight, while the bending joint 22 may preferably have a rounded convex support surface 23 that abuts against a concave surface 23 in the form of a wave trough in the wavelike corrugation of the outer tube 3. The support also functions in the case of an entirely smooth or cylindrical outer tube, although the axial engagement will not be as firm.

A complete length of cable protection takes the form of a number of support means disposed as shown for example in FIG. 2 and situated at suitable lengthwise spacing (along the cable) which may be a multiple of the axial extent of each support means. The heat-shrinkable tubing 5 extends with advantage in portions which are divided, whereby each portion of the heat-shrinkable tubing extends continuously over the length of each spacing means; i.e., from the outside of one annular portion to the outside of another annular portion. The heat-shrinkable tubing has a shrink direction which according to the invention runs axially, whereby the heat-shrinkable tubing contracts in an axial direction in response to a specific influence such as heat treatment exceeding a predetermined number of degrees but remaining below a maximum temperature; e.g., applying at the time of shrinking a temperature range of the order of 60-80 degrees C. An example of suitable material is cross-linked polyolefin.

According to an advantageous embodiment, the fitting of the cable protection is performed as follows.

In practice, the cable protection takes the form of a number of separate complete prefabricated units whereby each unit comprises a heat-shrinkable film portion 5 in tubular form or in the form of a rectangular piece, and the support means 6 which are connected to the heat-shrinkable film and take the form of the two ring portions 3 and the intermediate spacing means 9, 10. In the version with closed ring portions 3, the cable protection is applied by each unit of tubular heat-shrinkable film (with diameter exceeding the transverse dimension of the cable) being threaded on the cable from the latter's end and moved in a longitudinal direction to a desired fitting position. In the version with broken (i.e. lockable) ring portions with free ends as depicted in FIG. 3, and the heat-shrinkable film 5 in the form of a rectangular piece, the units in an open state are placed from the side directly on the intended location along the cable, followed by the ring portions 7, 8 and the heat-shrinkable film portion 5 being closed to form rings and tube respectively, and being locked. In the fitted position, the support means have a stable internal position with a mutual intermediate space between the annular portions such that the spacing means 9-16 are situated in a radially inner position with the bending joint 22 and its support surface 23 with a diametrically inside dimension which is clearly less than the smallest inside diameter of the inside wall 4 of the outer tube 3. This fitting position is represented by chain-dotted lines in FIGS. 2 and 3. Thus the two portions 9, 10 are at an obtuse and relatively large angle v. Each support means with its annular portions 7, 8 is firmly attached by suitable means to the heat-shrinkable tubing, but the latter is not firmly connected to the shell surface 25 of the cable portion and is therefore able to move somewhat in an axial direction.

When the support means are fitted into place, the cable portion 2 with the attached support means is drawn through the outer tube 3 to its desired functional position in the axial direction; i.e., with the ends of the cable portion normally protruding from the ends of the outer cover to cater for (accommodate) subsequent connection to desired components; e.g., in a motor vehicle. When the axial position has been assumed, the heat-shrinkable tubing or, in practice, the whole cable with support means and outer tube, is heated to, for example, 60-80 degrees C.; i.e., exceeding the shrink temperature of the heat-shrinkable tubing. The result is that the tubing shrinks; i.e., contracts axially, carrying with it the two annular portions 7, 8 which are drawn towards one another so that the distance between them is reduced to about 75% of the original distance. This means that the spacing means 9-16 expand radially outwards; i.e., the two legs 20, 21 in each spacing means become angled at a smaller angle µ, causing the bending joint 22 to move radially outwards to supportive contact of its support surface 23 with the inside wall 4 of the outer tube 3. Upon reduction of temperature, the heat-shrinkable tubing remains in its shrunk state and hence the support means remain in their fully tensioned position depicted in FIGS. 2 and 3.

The heating described above may be effected in various ways; e.g., in a prefabrication process whereby the cable with the outer cover continuously passes a heating station or prefabricated lengths are heated at said station. Heating may alternatively be effected by passing through the cable portion an electric current of such magnitude that the desired temperature rise is achieved by electrical resistance without any damage to insulating portions.

Suitable material for the spacing means of the cable protection was mentioned above and it should be appreciated that suitable construction material is any form of polymer that withstands the concerned temperature rise without deformation and has suitable rigidity, as well as some elasticity so that the jointing functions can be built into the material and the spacing means can to some extent absorb vibrations in order to also protect the cable portion against vibration damage. The elasticity also provides a resilience which means that radial expansion will not be rigid and critical, and that the two legs 9, 10 can assume a bent position if the annular portions move together more than is required for abutment of the support surface 23 against the outer tube.

It should be appreciated that the invention is not limited to the example of the embodiment described above and depicted in the drawings. It is for example contemplated that the cable protection can be of different design and construction. It is further contemplated that the number of annular portions is greater; e.g., three, resulting in twice as many spacing means per unit. The spacing means may take a different form such as an arcuate shape in which case the bending joint 22 may be omitted. This may be an advantageous shape if in the case of an outer tube with smooth inside wall it is desirable to allow axial movement of the cable portion and the spacing means. Instead of the ring portions taking the form of closed rings, they may be made open or divisible. This would make it possible for the support means to be fitted on the cable portion from the side. Any broken ring portions 7, 8 used may be divided so that each unit comprises two halves which are locked together or are fastened on the cable portion.

What is claimed is:

1. A cable protection arrangement comprising:
    a tubular outer cover (3);
    at least one support means (6) for holding in position a cable portion (2) extending axially in the outer cover with intermediate space relative to an inside wall (4) of the outer cover;
    a heat-shrinkable film (5) surrounding the cable portion (2) at least along a length of one of the at least one support means (6) and which is oriented with a shrinking direction substantially aligned with an axial direction of the cable portion (2); and said at least one support means (6) is connected to the heat-shrinkable film and configured to expand radially outwards towards the inside wall (4) of the outer cover (3) in response to contraction of the heat-shrinkable film in the axial direction of the cable portion (2).

2. The cable protection arrangement as recited in claim 1, wherein each support means (6) comprises at least two axial annular portions (7, 8) disposed with intermediate spacing and surrounding the cable portion and the heat-shrinkable film and each support means (6) further comprises at least two spacing means which extend between the annular portions that take the form of bridging portions (9, 10), each with two radially inner end portions (18, 19) at respective annular portions and with a radially outer portion (23) configured to provide support against the inside wall (4) of the protective cover when the heat-shrinkable film is in a shrunk state.

3. The cable protection arrangement as recited in claim 2, wherein the annular portions (7, 8) are subdivided so that the at least one support means (6) can be placed on the cable portion (2) from the side.

4. The cable protection arrangement as recited in claim 3, further comprising a lock (28) at subdivision breaks in the annular portions (7, 8) that are configured to join two adjacent ends (26, 27) of the annular portions at the subdivision.

5. The cable protection arrangement as recited in claim 4, wherein the lock (28) is configured to allow individual adaptation of the annular portions (7, 8) to the diameter of the cable portion.

6. The cable protection arrangement as recited in claim 2, wherein the bridging portions (9, 10) are V-shaped with two legs (20, 21) and an intermediate bending joint (22) and with bending joints at the end portions (18, 19).

7. The cable protection arrangement as recited in claim 1, wherein the outer cover (3) is a corrugated flexible tube and the heat-shrinkable film is heat-shrinkable tubing (5).

8. A method of fitting a cable protection for a cable portion (2) in a hoselike or tubular outer cover (3) with intermediate support means (6), said method comprising:
  applying cable protection units round the circumference of the cable portion with heat-shrinkable film portions (5) closest to the cable portion, and support means (6) connected to the heat-shrinkable film and dimensioned so that said support means (6) have a radial dimension less than a smallest inside diameter of the outer cover (3);
  applying the outer cover; and
  treatment of the heat-shrinkable film to the shrunk state and thereby causing contraction in the axial direction of the support means which causes expansion of the support means in a radial direction with respect to the cable portion (2) and thereby establishing supportive contact with an inside wall (4) of the outer cover (3).

9. The method as recited in claim 8, wherein the cable protection units are threaded on the cable portion (2) from an end thereof and are positioned at desired positions along the cable portions length and the heat-shrinkable film is heated to the shrunk state after the outer cover (3) has been applied.

10. The method as recited in claim 8, wherein the annular portions (7, 8) are subdivided and the cable protection units are placed on the cable portion (2) from a side thereof at desired positions along the cable portion's length and then the heat-shrinkable film is heated to the shrunk state after the outer cover (3) has been applied.

* * * * *